Patented Oct. 7, 1930

1,777,803

UNITED STATES PATENT OFFICE

CHARLES H. MARBLE, OF WORCESTER, MASSACHUSETTS

CUTTING COMPOUND

No Drawing.  Application filed January 4, 1928. Serial No. 244,561.

This invention relates to a cutting oil or compound such as is used in machine tool or grinding machine operations to cool the tools or wheels as well as to lubricate the contacting surfaces of the tools and work.

In the more modern practice of machine tool and grinding machine operations, it is customary to flood the work and tool or wheel with a copious flow of cutting compound which is usually circulated and recirculated by a suitable oil pump. Such copious provision of lubricant is found to greatly reduce the tool or wheel wear and to substantially increase the permissible speed of operation.

It is the general object of my invention to provide a cutting compound of a novel composition by the use of which improved operating results are obtainable. To the attainment of this object I have provided the compound as hereinafter described and more particularly pointed out in the appended claims.

In the preferred form, my improved compound comprises a mixture of lard-oil and vinegar, each in substantial quantities, together with the addition in relatively small quantities of one or more of the substances, sulphur, soda and borax.

In a particularly satisfactory embodiment of my invention the ingredients are used in the following proportion: lard-oil 3 gallons, vinegar 2 gallons, sulphur 1 pound, soda 1 pound, borax 1 pound.

These ingredients, suitably combined, make substantially five gallons of cutting compound.

In combining the ingredients, I preferably heat the sulphur to a temperature of approximately 350° Fahrenheit and then mix it with the soda, borax and vinegar and boil the mixture vigorously for a period of approximately fifteen minutes, at the end of which time all of these ingredients have thoroughly dissolved and mixed together to form a relatively thin liquid. I then thoroughly mix and combine the hot liquid with rather more than an equal amount of lard-oil and allow the mixture to cool, after which it is ready for shipment and use.

The sulphur is primarily effective in giving body to the compound, the soda prevents rust of the machine parts or work and the borax apparently has an important cooling effect on the tool or wheel and assists the cutting and wearing qualities thereof.

The vinegar renders the mixture free-flowing so that it falls quickly away from the revolving cutter and exposes the non-working portions of the cutter to the cooling effects of the atmosphere. Without the addition of vinegar the compound adheres closely to the cutter, preventing access of air thereto and causing frequent overheating.

It is found in practice that my improved cutting compound, composed of the ingredients above described and preferably combined in the manner set forth, is particularly adapted to machine tool and grinding operations and that by the use of this improved compound the tool or wheel wear is reduced and the rate or speed of operation may be substantially increased.

Having thus described my invention and the advantages thereof, I do not wish to be limited to the exact details and proportions herein described otherwise than as set forth in the claims and what I claim is:—

1. A cutting compound formed by mixing lard-oil and vinegar, each in substantial proportions, together with relatively small amounts of sulphur, soda and borax in addition thereto.

2. A cutting compound formed by mixing lard-oil and vinegar in substantial proportions, together with a relatively small amount of soda in addition thereto.

3. A cutting compound formed by mixing lard-oil and vinegar in substantially the proportion of three to two, together with relatively small amounts of sulphur, soda and borax in addition thereto.

4. A cutting compound formed by mixing and intimately combining substantially three gallons of lard-oil, two gallons of vinegar, one pound of sulphur, one pound of soda, and one pound of borax.

In testimony whereof I have hereunto affixed my signature.

CHARLES H. MARBLE.